US008379855B2

(12) United States Patent
Kubota et al.

(10) Patent No.: US 8,379,855 B2
(45) Date of Patent: Feb. 19, 2013

(54) CIPHERING IN A PACKET-SWITCHED TELECOMMUNICATIONS SYSTEM

(75) Inventors: Keiichi Kubota, Weybridge (GB); Juho Mikko Oskari Pirskanen, Tampere (FI)

(73) Assignee: Nokia Corporation, Espoo (FI)

( * ) Notice: Subject to any disclaimer, the term of this patent is extended or adjusted under 35 U.S.C. 154(b) by 225 days.

(21) Appl. No.: 12/793,245

(22) Filed: Jun. 3, 2010

(65) Prior Publication Data

US 2011/0299681 A1   Dec. 8, 2011

(51) Int. Cl.
  *H04K 1/00* (2006.01)
(52) U.S. Cl. .................. 380/247; 380/255; 380/270
(58) Field of Classification Search .................. 370/328; 380/247, 255, 270
See application file for complete search history.

(56) References Cited

U.S. PATENT DOCUMENTS

| 7,054,270 | B2 * | 5/2006 | Yi et al. ................. | 370/232 |
| 7,154,873 | B2 * | 12/2006 | Yi ........................... | 370/338 |
| 7,577,256 | B2 | 8/2009 | Vialen et al. | |
| 7,602,917 | B2 | 10/2009 | Vialen et al. | |
| 2001/0030965 | A1 * | 10/2001 | Tourunen et al. ........ | 370/394 |
| 2003/0076859 | A1 * | 4/2003 | Jiang ...................... | 370/509 |
| 2007/0041382 | A1 * | 2/2007 | Vayanos et al. ......... | 370/394 |
| 2007/0140491 | A1 * | 6/2007 | Yi ........................... | 380/250 |
| 2008/0123655 | A1 * | 5/2008 | Kim et al. ............... | 370/394 |
| 2008/0162929 | A1 * | 7/2008 | Ishikawa et al. ......... | 713/160 |
| 2009/0016301 | A1 * | 1/2009 | Sammour et al. ........ | 370/331 |
| 2010/0039996 | A1 * | 2/2010 | Ohta et al. ............... | 370/328 |
| 2010/0284535 | A1 * | 11/2010 | Sharma et al. ........... | 380/270 |
| 2011/0263221 | A1 * | 10/2011 | Yi et al. .................. | 455/410 |
| 2012/0039471 | A1 * | 2/2012 | Kim et al. ............... | 380/270 |
| 2012/0099525 | A1 * | 4/2012 | Maheshwari ........... | 370/328 |

FOREIGN PATENT DOCUMENTS

| EP | 1868311 | | 12/2007 |
| EP | 1868311 A1 | * | 12/2007 |
| EP | 2086150 | | 8/2009 |
| EP | 2086150 A2 | * | 8/2009 |
| WO | WO2007075474 | | 7/2007 |
| WO | WO 2007075474 A1 | * | 7/2007 |

OTHER PUBLICATIONS

International Search Report of International Application No. PCT/FI2011/050447—Date of Completion of Search: Jul. 28, 2011, 6 pages.
Written Opinion of the International Searching Authority of International Application No. PCT/FI2011/050447—Date of Completion of Opinion: Jul. 28, 2011, 8 pages.
Packet Data Convergence Protocol (PDCP) Specification, 3GPP TS 36.323 V9.0.0 (Dec. 2009), 24 pages.

* cited by examiner

*Primary Examiner* — Jeffrey Pwu
*Assistant Examiner* — Carlos Amorin
(74) *Attorney, Agent, or Firm* — Locke Lord LLP

(57) ABSTRACT

A method including generating a plurality of convergence layer protocol data units in a packet-switched telecommunications system protocol stack; ciphering the plurality of convergence layer protocol data units using a ciphering sequence number; transferring the plurality of ciphered convergence layer protocol data units to a link layer of the packet-switched telecommunications system; discarding at least one ciphered convergence layer protocol data unit at the link layer and generating a link layer protocol data unit from at least one of the ciphered convergence layer protocol data units that has not been discarded; and transmitting the link layer protocol data unit and information relating to the discarding for a peer link layer.

27 Claims, 6 Drawing Sheets

CIPHERING IN A PACKET-SWITCHED TELECOMMUNICATIONS SYSTEM

TECHNICAL FIELD

The present invention generally relates to ciphering in a packet-switched telecommunications system. The invention relates particularly, though not exclusively, to the ciphering of uplink data within a wireless terminal of a cellular wireless communication system that supports high-speed uplink packet access (HSUPA).

BACKGROUND ART

Universal mobile telecommunications system (UMTS) packet network architecture includes as major architectural elements user equipment (UE), a UMTS terrestrial radio access network (UTRAN) and a core network (CN). The user equipment (UE) is interfaced to a universal mobile telecommunications system terrestrial radio access network (UTRAN) over a radio (Uu) interface, while the universal mobile telecommunications system terrestrial radio access network (UTRAN) interfaces to the core network (CN) over a (wired) Iu interface.

3GPP (Third Generation Partnership Project) specifies a universal mobile telecommunications system terrestrial radio access (UTRA) and more specifically the wideband code division multiple access (WCDMA) high speed uplink packet access (HSUPA), which is an enhanced uplink feature used in the frequency division duplex (FDD) mode.

In future 3GPP releases, multi-carrier high-speed uplink packet access (MC-HSUPA) operation will be implemented enabling higher uplink throughput for the user equipment (UE). The mobile processing unit load for the user plane (U-plane) activities will be significantly increased due to the introduction of the multi-carrier high-speed uplink packet access (MC-HSUPA) feature.

SUMMARY

According to a first example aspect of the invention there is provided a method comprising:
  generating a plurality of convergence layer protocol data units in a packet-switched telecommunications system protocol stack;
  ciphering said plurality of convergence layer protocol data units using a ciphering sequence number;
  transferring said plurality of ciphered convergence layer protocol data units to a link layer of the packet-switched telecommunications system;
  discarding at least one ciphered convergence layer protocol data unit at the link layer and generating a link layer protocol data unit from at least one of the ciphered convergence layer protocol data units that has not been discarded; and
  transmitting the link layer protocol data unit and information relating to the discarding for a peer link layer.

The ciphering sequence number may be a count-c parameter comprising 20 bits of convergence layer hyper frame number and 12 bits of convergence layer sequence number. The information relating to the discarding may contain a status protocol data unit indicative of a set of discarded convergence layer protocol data units.

According to a second example aspect of the invention there is provided a method comprising:
  receiving a link layer protocol data unit and information relating to discarding of at least one ciphered convergence layer protocol data unit at a peer link layer in a packet-switched telecommunications system;
  generating a ciphered convergence layer protocol data unit from the received link layer data unit when transferred to a convergence layer;
  defining a deciphering sequence number based on the information relating to the discarding; and
  deciphering the ciphered convergence layer protocol data unit using the deciphering sequence number.

According to a third example aspect of the invention there is provided an apparatus comprising:
  at least one processor;
  at least one memory including computer program code, the at least one memory and the computer program code configured to, with the at least one processor, cause the apparatus at least to perform:
    generate a plurality of convergence layer protocol data units in a packet-switched telecommunications system protocol stack;
    cipher said plurality of convergence layer protocol data units using a ciphering sequence number;
    transfer said plurality of ciphered convergence layer protocol data units to a link layer of the packet-switched telecommunications system;
    discard at least one ciphered convergence layer protocol data unit at the link layer and generate a link layer protocol data unit from at least one of the ciphered convergence layer protocol data units that has not been discarded; and
    transmit the link layer protocol data unit and information relating to the discarding for a peer link layer.

According to a fourth example aspect of the invention there is provided an apparatus comprising:
  at least one processor;
  at least one memory including computer program code, the at least one memory and the computer program code configured to, with the at least one processor, cause the apparatus at least to perform:
    receive a link layer protocol data unit and information relating to discarding of at least one ciphered protocol data unit at a peer link layer in a packet-switched telecommunications system;
    generate a ciphered convergence layer protocol data unit from the received link layer protocol data unit in a packet-switched telecommunications system protocol stack;
    define a deciphering sequence number based on the information relating to the discarding; and
    decipher the ciphered convergence layer protocol data unit using the deciphering sequence number.

According to a fifth example aspect of the invention there is provided a computer program embodied on a computer readable medium comprising computer executable program code which, when executed by at least one processor of an apparatus, causes the apparatus to perform:
  generating a plurality of convergence layer protocol data units in a packet-switched telecommunications system protocol stack;
  ciphering said plurality of convergence layer protocol data units using a ciphering sequence number;
  transferring said plurality of ciphered convergence layer protocol data units to a link layer of the packet-switched telecommunications system;
  discarding at least one ciphered convergence layer protocol data unit at the link layer and generating a link layer protocol data unit from at least one of the ciphered convergence layer protocol data units that has not been discarded; and transmitting the link layer protocol data unit and information relating to the discarding for a peer link layer.

According to a sixth example aspect of the invention there is provided a computer program embodied on a computer readable medium comprising computer executable program code which, when executed by at least one processor of an apparatus, causes the apparatus to perform:

receiving a link layer protocol data unit and information relating to discarding of at least one ciphered convergence layer protocol data unit at a peer link layer in a packet-switched telecommunications system;

generating a ciphered convergence layer protocol data unit from the received link layer data unit when transferred to a convergence layer;

defining a deciphering sequence number based on the information relating to the discarding; and deciphering the ciphered convergence layer protocol data unit using the deciphering sequence number.

According to a seventh example aspect of the invention there is provided a system comprising:

at least one processor;

at least one memory including computer program code, the at least one memory and the computer program code configured to, with the at least one processor, cause the system at least to perform:

generate a plurality of convergence layer protocol data units in a packet-switched telecommunications system protocol stack;

cipher said plurality of convergence layer protocol data units using a ciphering sequence number;

transfer said plurality of ciphered convergence layer protocol data units to a link layer of the packet-switched telecommunications system;

discard at least one ciphered convergence layer protocol data unit at the link layer and generate a link layer protocol data unit from at least one of the ciphered convergence layer protocol data units that has not been discarded;

transmit the link layer protocol data unit and information relating to the discarding for a peer link layer;

receive a link layer protocol data unit and information relating to discarding of at least one ciphered protocol data unit at a peer link layer in a packet-switched telecommunications system;

generate a ciphered convergence layer protocol data unit from the received link layer protocol data unit in a packet-switched telecommunications system protocol stack;

define a deciphering sequence number based on the information relating to the discarding; and decipher the ciphered convergence layer protocol data unit using the deciphering sequence number.

Any foregoing memory medium may comprise a digital data storage such as a data disc or diskette, optical storage, magnetic storage, holographic storage, opto-magnetic storage, phase-change memory, resistive random access memory, magnetic random access memory, solid-electrolyte memory, ferroelectric random access memory, organic memory or polymer memory. The memory medium may be formed into a device without other substantial functions than storing memory or it may be formed as part of a device with other functions, including but not limited to a memory of a computer, a chip set, and a sub assembly of an electronic device.

Different non-binding example aspects and embodiments of the present invention have been illustrated in the foregoing. The above embodiments are used merely to explain selected aspects or steps that may be utilized in implementations of the present invention. Some embodiments may be presented only with reference to certain example aspects of the invention. It should be appreciated that corresponding embodiments may apply to other example aspects as well.

BRIEF DESCRIPTION OF THE DRAWINGS

The invention will be described, by way of example only, with reference to the accompanying drawings, in which.

DETAILED DESCRIPTION

In the following description, like numbers denote like elements.

Figure 1:
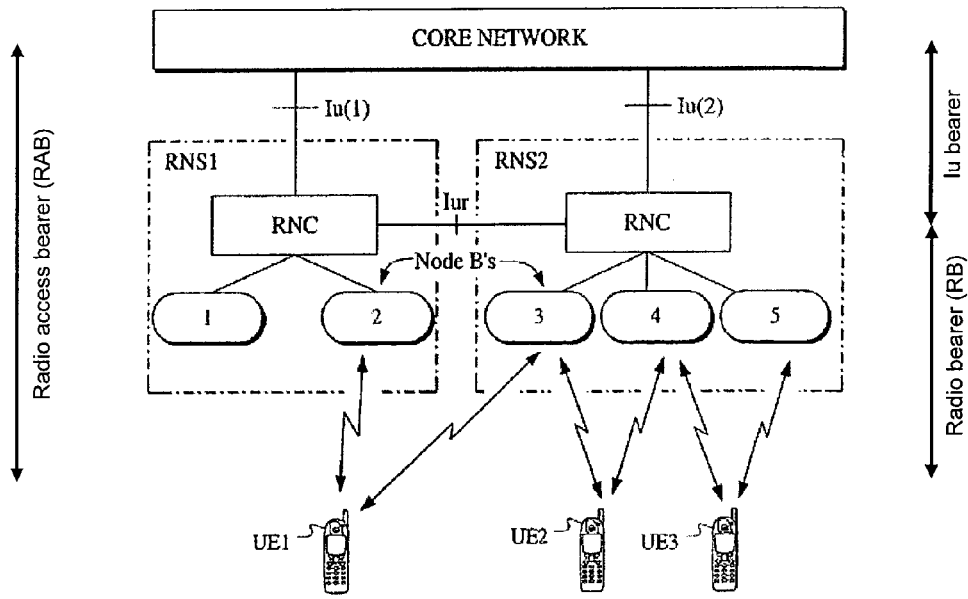
FIG. 1 shows some details of the system architecture.

FIG. 1 shows some details of the system architecture. Universal mobile telecommunications system terrestrial radio access network (UTRAN) includes multiple radio network subsystems (RNS), each of which contains at least one radio network controller (RNC). Each radio network controller (RNC) may be connected to multiple Node B's, which are universal mobile telecommunications system (UMTS) counterparts to global system for mobile telecommunications (GSM) base stations. Each Node B may be in radio contact with multiple user equipments (UE) via the radio interface Uu. Node B may also mean eNode B in the following description. eNode B is Node B in evolved universal mobile telecommunications system terrestrial radio access network (E-UTRAN). E-UTRAN is the air interface of long term evolution (LTE) upgrade path for mobile networks, also referred to as the 3GPP work item on the long term evolution (LTE).

A given user equipment (UE) may be in radio contact with multiple Node B's/eNode B's even if one or more of the Node B's/eNode B's are connected to different radio network controllers (RNC). For instance a user equipment 1 (UE1) may be in radio contact with a first Node B 2 of radio network subsystem 1 (RNS1) and a second Node B 3 of radio network subsystem 2 (RNS2), where the first Node B 2 and the second Node B 3 are neighboring Node B's. The radio network controllers (RNC) of different radio network subsystems (RNS) may be connected by an Iur interface which allows mobile user equipments (UE) to stay in contact with both radio network controllers (RNC) while traversing from a cell belonging to a Node B of one radio network controller (RNC) to a cell belonging to a Node B of another radio network controller (RNC).

One of the radio network controllers (RNC) will act as the serving or controlling radio network controller (SRNC or CRNC) while the other will act as a drift radio network controller (DRNC). A chain of such drift radio network controllers (DRNC) can even be established to extend from a given serving radio network controller (SRNC). The multiple Node B's will typically be neighboring Node B's in the sense that each will be in control of neighboring cells. The mobile user equipments (UE) are able to traverse the neighboring cells without having to re-establish a connection with a new Node B. Either the Node B's are connected to a common radio network controller (RNC) or, if they are connected to different radio network controllers (RNC), the radio network controllers (RNC) are connected to each other. During such movements of user equipment (UE), it is sometimes required that radio links are added and abandoned so that the user equipment (UE) may always maintain at least one radio link to the universal mobile telecommunications system terrestrial radio access network (UTRAN). This is called soft-handover (SHO).

A service of information transfer between the user equipment (UE) and the core network (CN) may be provided and named as a radio access bearer (RAB). The radio access bearer (RAB) consists of two parts. A first part is a radio bearer (RB) between the user equipment (UE) and the radio network controller (RNC). A second part of the radio access bearer (RAB) is an Iu bearer between the radio network controller (RNC) and the core network (CN). The radio bearer (RB) may be used for both user data and signaling. However, the radio access bearer (RAB) consists of an Iu bearer and user data of a radio bearer (RB).

Figure 2:
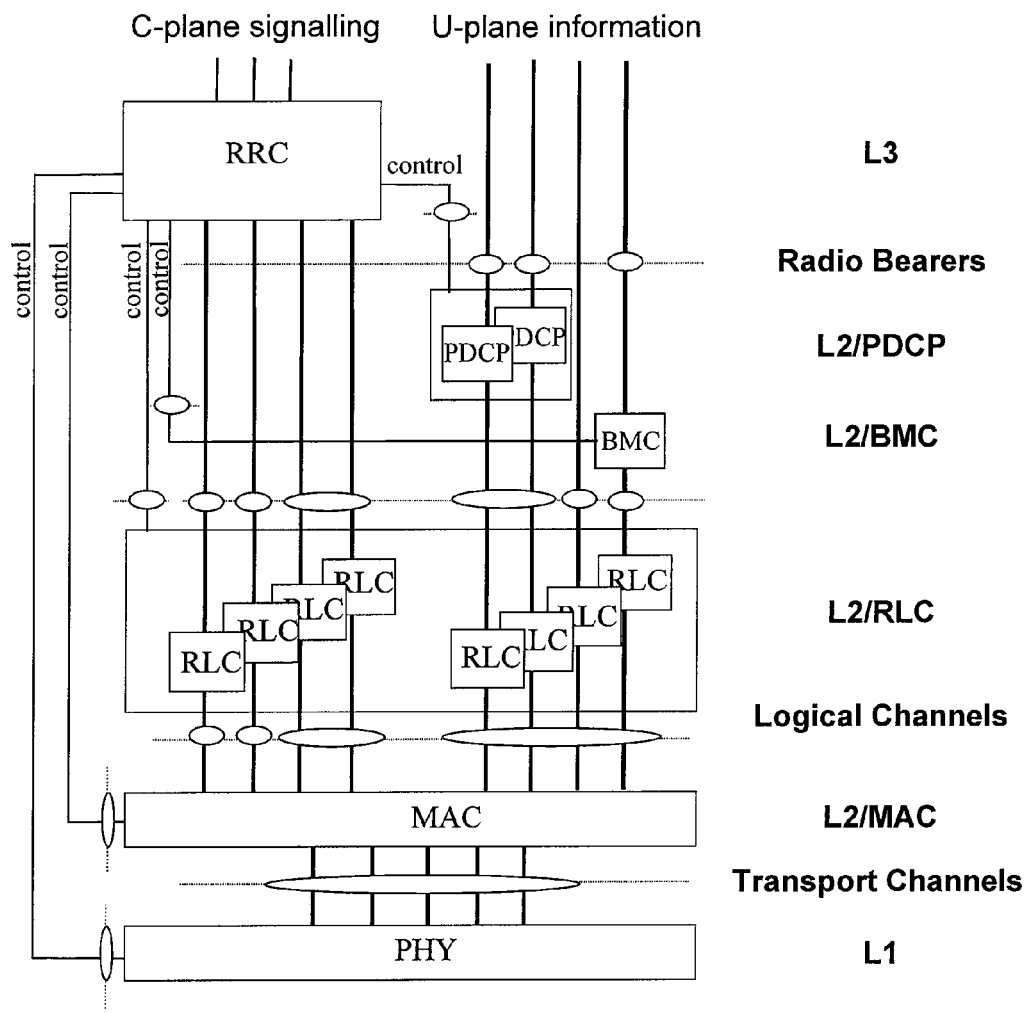
FIG. 2 illustrates a structure of a radio interface protocol between a user equipment (UE) and the network according to the 3GPP radio access network.

Referring to FIG. 2, a radio interface protocol has horizontal layers comprising a physical layer, a data link layer, and a network layer. The radio interface protocol further has vertical planes comprising a user plane (U-plane) for transmitting user data and a control plane (C-plane) for transmitting control information.

The user plane (U-plane) is a region that handles traffic information of the user, such as voice and Internet protocol (IP) packets, while the control plane (C-plane) is a region that handles control information for an interface of a network, maintenance and management of a call, and the like.

The protocol layers in FIG. 2 can be divided into a first layer (L1), a second layer (L2), and a third layer (L3) based on the three lower layers of an open system interconnection (OSI) standard model. Each layer will be described in more detail as follows.

The first layer (L1), namely, a physical layer (PHY), provides an information transfer service to an upper layer by using various radio transmission techniques. The physical layer (PHY) is connected to an upper layer called a medium access control (MAC) layer, via a transport channel. The medium access control (MAC) layer and the physical layer (PHY) send and receive data with one another via the transport channel.

The second layer (L2) includes a medium access control (MAC) layer, a radio link control (RLC) layer, a broadcast/multicast control (BMC) layer, and a packet data convergence protocol (PDCP) layer. The medium access control (MAC) layer provides an allocation service of medium access control (MAC) parameters for allocation and re-allocation of radio resources. The medium access control (MAC) layer is connected to an upper layer called the radio link control (RLC) layer, via a logical channel.

Various logical channels are provided according to the kind of transmitted information. In general, when information of the control plane (C-plane) is transmitted, a control channel is used. When information of the user plane (U-plane) is transmitted, a traffic channel is used.

The radio link control (RLC) layer supports reliable data transmissions and performs segmentation and concatenation function on a plurality of radio link control service data units (RLC SDU) delivered from an upper layer. When the radio link control (RLC) layer receives the radio link control service data units (RLC SDU) from the upper layer, the radio link control (RLC) layer adjusts the size of each radio link control service data unit (RLC SDU) in an appropriate manner upon considering processing capacity, and then creates certain data units with header information added thereto. The created data units are called protocol data units (PDU), which are then transferred to the medium access control (MAC) layer via a logical channel. The radio link control (RLC) layer includes a radio link control (RLC) buffer for storing the radio link control service data units (RLC SDU) and/or the RLC protocol data units (RLC PDU).

The packet data convergence protocol (PDCP) layer, as a higher layer of the radio link control (RLC) layer, allows the data transmitted through a network protocol (such as an IPv4 or IPv6) to be effectively transmitted on a radio interface. To achieve this, the packet data convergence protocol (PDCP) layer reduces unnecessary control information used for a wired network, also known as header compression.

A broadcast/multicast control (BMC) layer transmits cell broadcast messages transferred from a core network to terminals through a radio interface. For this purpose, the BMC layer performs the functions of storing, scheduling, and transmitting cell broadcast messages.

There is a radio resource control (RRC) layer at a lowermost portion of the L3 layer. The radio resource control (RRC) layer is defined only in the control plane (C-plane) and handles the controlling of logical channels, transport channels, and physical channels with respect to setting, resetting, and releasing of radio bearers. The radio bearer service refers to a service that the second layer (L2) provides for data transmission between the terminal and the universal mobile telecommunications system terrestrial radio access network (UTRAN). Setting the radio bearer may refer to defining protocol layers and channel characteristics of channels required for providing a specific service. Furthermore, setting the radio bearer may refer to respectively setting substantial parameters and operation methods.

For reference, the packet data convergence protocol (PDCP) and broadcast/multicast control (BMC) layers exist in the user plane (U-plane) only, while the medium access control (MAC) and radio link control (RLC) layers can exist in the user plane (U-plane) or the control plane (C-plane)

according to the upper layer connected thereto. Namely, when the radio link control (RLC) layer provides services to the radio resource control (RRC) layer, the medium access control (MAC) and radio link control (RLC) layers exist in the control plane (C-plane). Otherwise, they exist in the user plane (U-plane).

Moreover, the other second layers (excluding the medium access control (MAC) layer) have a plurality of entities to guarantee the quality of service (QoS) that is appropriate for each radio bearer (RB). Namely, a multitude of entities can exist in one layer, and each entity provides a separate service.

The radio link control (RLC) layer will be explained in more detail as follows. A basic function of the radio link control (RLC) layer is to guarantee the quality of service (QoS) of each radio bearer (RB) and their corresponding data transmissions. As the radio bearer (RB) service is a service that the second layer of the radio protocol provides to higher layers, the entire second layer affects the quality of service (QoS). In particular, the radio link control (RLC) layer has significant influence to the quality of service (QoS).

The radio link control (RLC) provides an independent radio link control (RLC) entity for each radio bearer (RB) in order to guarantee the particular quality of service (QoS) of the radio bearer (RB). Furthermore, the radio link control (RLC) provides three radio link control (RLC) modes. The modes are a transparent mode (TM), an unacknowledged mode (UM), and an acknowledged mode (AM) to support various types of quality of service (QoS). As the three radio link control (RLC) modes support different quality of service (QoS) requirements, there are differences in operation and in specific functions. Accordingly, each operational mode of the radio link control (RLC) must be considered in more detail.

In transparent mode (TM), employing a transparent mode radio link control (TM RLC), no protocol overhead is added to the radio link control service data unit (RLC SDU) that is transferred from higher layer. As the radio link control (RLC) lets the service data unit (SDU) pass transparently, this mode is called transparent mode (TM). Accordingly, the user plane (U-plane) and the control plane (C-plane) perform the following functions. In the user plane (U-plane) real-time circuit switched data transmissions (such as voice and streaming in the circuit switched service domain) are handled. Reason for this is the brevity of the data processing time at the radio link control (RLC).

Meanwhile, unlike the transparent mode (TM), a mode in which protocol overhead is added at the radio link control (RLC) is called non-transparent mode. Non-transparent mode is divided into unacknowledged mode (UM) that has no reception acknowledgement for the transferred data, and acknowledged mode (AM) that provides acknowledgements. In the unacknowledged mode (UM), employing an unacknowledged mode radio link control (UM RLC), a protocol data unit (PDU) header including a sequence number (SN) is added to each protocol data unit (PDU). Furthermore, such protocol data unit (PDU) is transferred, in order to allow the receiving side to identify which protocol data units (PDU) were lost during transmission. As such, in unacknowledged mode (UM), the user plane (U-plane) handles broadcast/multicast data transmissions or real-time packet data transmissions, such as voice (VoIP) and streaming in the circuit switched service domain and the packet service domain.

As in the unacknowledged mode (UM), in the acknowledged mode (AM) a header including sequence number (SN) is added to construct a protocol data unit (PDU). However, unlike the unacknowledged mode (UM), a receiving side provides reception acknowledgement of the protocol data unit (PDU) sent from a transmitting side, in acknowledged mode (AM). Furthermore, in the acknowledged mode (AM), the receiving side provides acknowledgement in order to request re-transmission of any protocol data units (PDUs) that have not been properly received. This function of re-transmission is the most distinguishing characteristic in acknowledged mode radio link control (AM RLC). Thus, the object of acknowledged mode radio link control (AM RLC) is to guarantee error-free data transfers through re-transmissions. To achieve this object in acknowledged mode (AM), transmission of non-real-time packet data such as TCP/IP in the packet-switched domain is handled by the user plane (U-plane). The control plane (C-plane) handles the transmission of radio resource control (RRC) messages that need acknowledgement, among all the radio resource control (RRC) messages transmitted to a specific terminal.

Once the service data units (SDU) are delivered from a higher layer, the transmitting side acknowledged mode radio link control (AM RLC) performs segmentation and concatenation on the service data units (SDU). The service data units SDU may be of different sizes. Segmentation and concatenation is performed to construct an acknowledged mode data protocol data unit (AMD PDU) having a predetermined size. The acknowledged mode data protocol data unit (AMD PDU) includes a header added to a payload. The payload consists of a portion of a service data unit (SDU) or one or more service data units (SDU). The header consists of a sequence number (SN) of the protocol data unit (PDU) and a length indicator (LI) indicating the location of a boundary of the service data unit (SDU), if such boundary exists.

Considering the direction of data communication, transparent mode radio link control (TM RLC) and unacknowledged mode radio link control (UM RLC) are used in uni-directional communication, while acknowledged mode radio link control (AM RLC) is used in bi-directional communication because of the necessary feedback from a receiving side. Bi-directional communication is mainly used in point-to-point communication, whereby acknowledged mode radio link control (AM RLC) uses dedicated logical channels only. Regarding the structural differences, in acknowledged mode radio link control (AM RLC), a single radio link control (RLC) entity performs both transmission and reception. In transparent mode radio link control (TM RLC) and unacknowledged mode radio link control (UM RLC), a radio link control (RLC) entity exists at the transmission side and a radio link control (RLC) entity exists at the reception side.

The acknowledged mode radio link control (AM RLC) requires a more complicated structure and data-processing techniques due to the re-transmission function. In acknowledged mode radio link control (AM RLC), a re-transmission buffer is required in addition to a transmission buffer to manage re-transmission. The acknowledged mode radio link control (AM RLC) performs various functions, such as using a transmitting/receiving window for flow control, performing polling in which the transmitting side requests status information from a peer radio link control (RLC) entity at the receiving side, providing a status report in which the receiving side reports its buffer status to a peer radio link control (RLC) entity at the transmitting side, creating a status protocol data unit (PDU) for carrying status information, performing "Piggyback" a status protocol data unit (PDU) in which a data protocol data unit (PDU) is used to increase data transmission efficiency, and the like. Moreover, the acknowledged mode radio link control (AM RLC) needs various protocol parameters, state variables and a timer to support its various functions.

One of the main functions of a radio link control (RLC) is the service data unit (SDU) discard function, whereby certain radio link control service data units (RLC SDU), among the service data units (SDU) stored at the transmitting side radio link control (RLC) entity, are discarded to prevent overloading of the radio link control (RLC) buffer. The service data unit (SDU) discard function plays a significant role in guaranteeing the quality of service (QoS) of a radio bearer (RB) service provided by the radio link control (RLC). Typically, the transmitting side discards certain service data units (SDU) by using scheme employing a timer or a scheme employing a limited number of re-transmissions.

The timer scheme is used in all three kinds of radio link control (RLC) modes (TM, UM, AM). A transmitting side radio link control (RLC) entity operates a timer (e.g., a discard time) for measuring the time (duration) that each radio link control service data unit (RLC SDU) remains at the radio link control (RLC) layer, where each radio link control service data unit (RLC SDU) is received from an upper layer. If a particular service data unit (SDU) fails to be properly transmitted upon expiration of time period set by the timer, that service data unit (SDU) is discarded and all service data units (SDU) between the beginning of a transmitting window and the corresponding service data unit (SDU) are discarded as well.

The limited number of re-transmissions scheme is used in acknowledged mode radio link control (AM RLC) only. If the transmission and re-transmission of a particular radio link control protocol data unit (RLC PDU) continue to be unsuccessful and the maximum (limit) number of re-transmissions is reached, a transmitting side radio link control (RLC) entity discards any service data unit (SDU) that includes at least a portion of the corresponding radio link control protocol data unit (RLC PDU). This operation is described in more detail below.

The radio link control service data unit (RLC SDU) transferred down to the acknowledged mode radio link control (AM RLC) layer at the transmitting side is converted into a radio link control protocol data unit (RLC PDU) to be stored in a buffer. At this time, a counter for counting the number of transmissions for each radio link control protocol data units (RLC PDU) begins its count operation. The counter is incremented by '1' each time the radio link control protocol data unit (RLC PDU) is transmitted. If the transmission of a particular radio link control protocol data unit (RLC PDU) continues to be unsuccessful, and the counter reaches the maximum (limit) number of retransmissions, the acknowledged mode radio link control (AM RLC) discards all service data units (SDU) included in at least a portion of the corresponding PDU, as well as all service data units (SDU) between a beginning of a transmitting window and the corresponding service data unit (SDU).

In case the transmitting side acknowledged mode radio link control (AM RLC) discards at least one radio link control service data unit (RLC SDU), such a discard is notified to the receiving side acknowledged mode radio link control (AM RLC) so that the receiving window of the receiving side is moved. The receiving window can be moved because the receiving side no longer needs to stand by and wait for the service data unit (SDU) that has now been discarded and thus would not be transmitted. Here, this type of operation can be referred to as a move receiving window (MRW) function.

The transmitting side sends a move receiving window (MRW) message to the receiving side for moving the receiving window. Here, the move receiving window (MRW) command does not specify the location to which the receiving window should actually move to, but only provides information that a particular service data unit (SDU) has been discarded at the transmitting side. Upon receiving the move receiving window (MRW) message, the receiving side appropriately moves the receiving window based on the information of the discarded service data unit (SDU).

A procedure of moving a receiving window is called a move receiving window (MRW) procedure. The move receiving window (MRW) procedure includes the steps of transmitting a move receiving window (MRW) command from the transmitting side, moving the receiving window by the receiving side and transmitting receiving window move information to the transmitting side, and moving the transmitting window at the transmitting side.

In the uplink direction, a radio link control (RLC) entity may be radio aware. Being radio aware means that the transmitting mobile terminal is aware of current radio conditions because both radio link control (RLC) and medium access control (MAC) protocols are located in the same node. As a result, a radio link control protocol data unit (RLC PDU) size may be determined based on an instantaneous available data rate.

A radio aware radio link control (RLC) entity may generate radio link control protocol data units (RLC PDU) according to the available bit rate. There is minimal overhead and low error rates due to residual hybrid automatic repeat request (HARQ) error rates. However, a radio aware radio link control (RLC) entity may not be able to generate a radio link control protocol data unit (RLC PDU) at a given transmission time interval (TTI) because the generation of the radio link control protocol data unit (RLC PDU) within a short amount of time may require too much processing power. For example, a radio aware radio link control (RLC) entity requires that a ciphering function be performed on the generated radio link control protocol data units (RLC PDU). Additionally, a radio aware radio link control (RLC) entity has a higher overhead for small enhanced uplink transport format combination (E-TFC) sizes and a lower overhead for large transport block sizes. When flexible radio link control protocol data unit (RLC PDU) size is configured, user equipment (UE) can choose radio link control protocol data unit (RLC PDU) data size based on the data amount requested by the current enhanced uplink transport format combination (E-TFC) selection (as described above for radio aware radio link control (RLC) operation). User equipment (UE) may utilize the available uplink resource very efficiently when the radio aware method is used so the radio aware method may be ideal for high-speed data transfer and ideal for multi-carrier high-speed uplink packet access (MC-HSUPA).

However, the radio aware radio link control (RLC) operation has one concern regarding to a ciphering operation. For the fixed radio link control protocol data unit (RLC PDU) size case, user equipment (UE) may cipher uplink data prior to enhanced uplink transport format combination (E-TFC) selection due to radio link control (RLC) knows the radio link control protocol data unit (RLC PDU) size. However, for the radio aware radio link control (RLC) operation, user equipment (UE) cannot cipher uplink data until radio link control protocol data unit (RLC PDU) size is determined. Typically, the radio link control protocol data unit (RLC PDU) size is determined not until the enhanced uplink transport format combination (E-TFC) selection. Therefore, uplink data shall be ciphered within the very limited time period between the enhanced uplink transport format combination (E-TFC) selection and the physical channel data transmission timing. The time period may be only a number of nanoseconds.

If the radio aware radio link control (RLC) technique is used for the high data rate, the transmitter needs to cipher the radio link control protocol data unit (RLC PDU) data in a limited time slot between the available resource calculation for particular transmission timing and the physical layer data transmission timing. To reduce the mobile processing unit load, especially for a user plane (U-plane), some optimization needs to be considered.

In an example embodiment of the invention, the ciphering functionality is moved from the radio link control (RLC) layer to the packet data convergence protocol (PDCP) layer. By doing this, the ciphering operation can be decoupled from radio activities and the transmitter may not need to cipher data within the certain short time period anymore. Furthermore, better memory flexibility in the transmitting device, for example the user equipment (UE), may be achieved. For example, the packet data convergence protocol (PDCP) entity may pass the pointer address of the ciphered data to the radio link control (RLC) entity and then the radio link control (RLC) entity may provide the pointer address to indicate the radio link control protocol data unit (RLC PDU) data location to lower layer. In this way, the user equipment (UE) may reduce the number of memory copy operations.

In an example embodiment of the invention, to reduce ciphering synchronization procedure in packet data convergence protocol (PDCP) entity, packet data convergence protocol (PDCP) ciphering may be configured only when the corresponding radio link control (RLC) is configured with in-sequence delivery and acknowledge mode.

Figure 3:
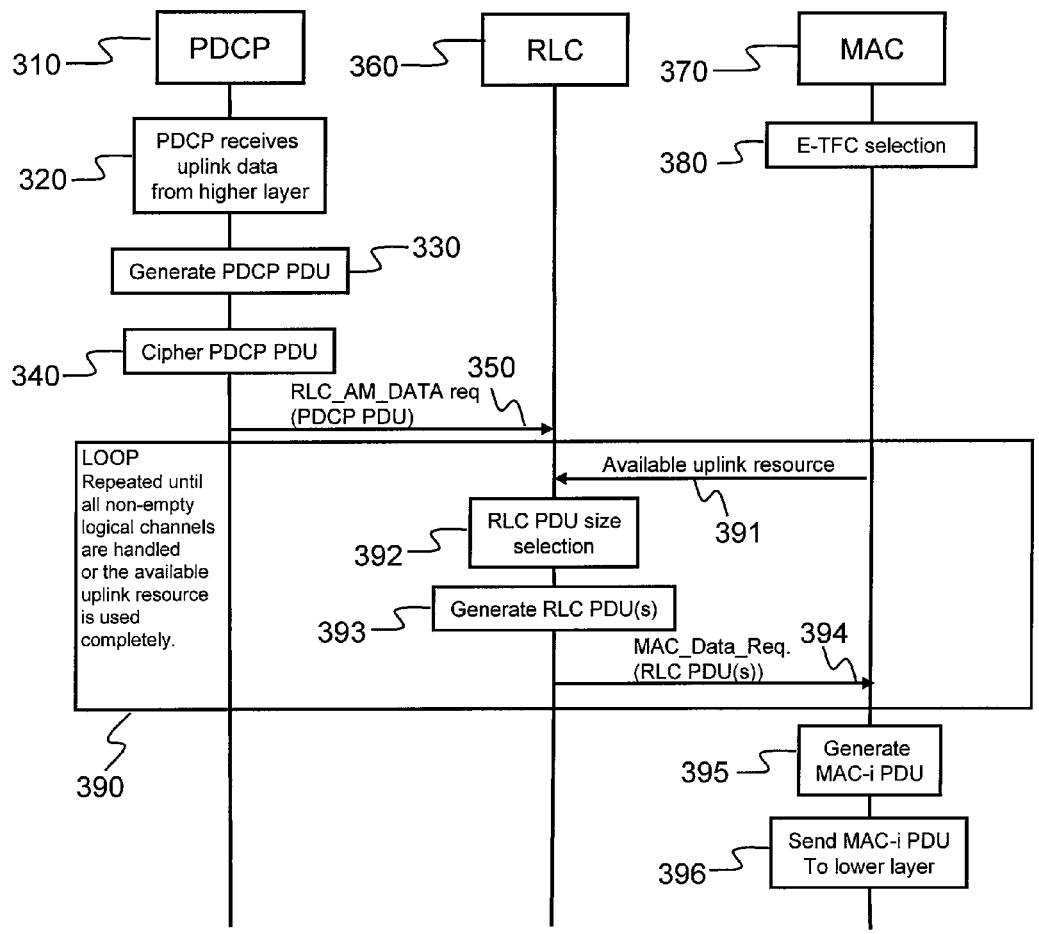
FIG. 3 shows main signaling for the uplink transmission according to an embodiment of the invention.

FIG. 3 shows main signaling for the uplink transmission according to an embodiment of the invention. The uplink transmission may be high speed uplink packet access (HSUPA) or some other wireless radio access utilizing convergence layer, such as packet data convergence protocol (PDCP).

In an example embodiment of the invention, the packet data convergence protocol (PDCP) 310 receives uplink data from a higher layer in block 320. In block 330, a convergence layer protocol data unit (PDCP PDU) is generated based on the received data. Ciphering of the convergence layer protocol data unit (PDCP PDU) is done in block 340. A request to transmit data (ciphered PDCP PDU) using acknowledged mode 350 is sent from the packet data convergence protocol (PDCP) 310 to a radio link control (RLC) 360. Medium access control (MAC) 370 is responsible for the enhanced transport format combination (E-TFC) selection process 380. The user equipment (UE) determines transport format combinations (TFC) that are available for at a dedicated channel (DCH) based on at least a maximum transmit power for the user equipment. A transport format combinations (TFC) is selected from the available transport format combinations (TFC) for the dedicated channel (DCH). Based on a remaining power after the transport format combinations (TFC) selecting, enhanced uplink TFC (E-TFC) is selected that is available for an enhanced dedicated channel (E-DCH) after the DCH TFC selection.

A loop 390 is repeated until all non-empty logical channels are handled or the available uplink resource is used completely. In the loop 390 the radio link control protocol data units (RLC PDU) are generated in block 393 according to radio link control protocol data unit (RLC PDU) size selected in block 392. Size selection is based on the data amount requested by the current enhanced transport format combination (E-TFC) selection (radio aware) discovering the available uplink resource information 391 informed by the medium access control (MAC) 370. In block 394, the generated radio link control protocol data units (RLC PDU) are sent to medium access control (MAC) 370 for generation of medium access control protocol data units (MAC-i PDU) 395 and sending them to lower layer 396.

Figure 4:
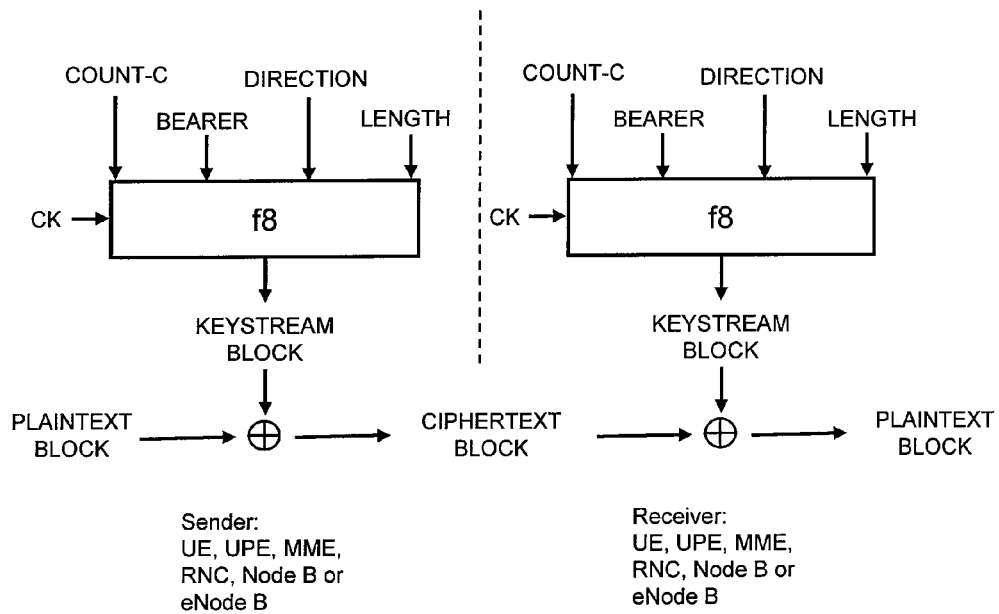
FIG. 4 illustrates use of a ciphering algorithm f8 to encrypt plaintext by applying a keystream using a bit per bit binary addition of the plaintext and the keystream in a sender which may be a user equipment (UE), user plane entity (UPE), mobility management entity (MME), radio network controller (RNC), Node B or eNode B.

FIG. 4 illustrates use of a ciphering algorithm f8 to encrypt plaintext by applying a keystream using a bit per bit binary addition of the plaintext and the keystream in a sender, which may be a user equipment (UE), user plane entity (UPE), mobility management entity (MME), radio network controller (RNC), Node B or eNode B.

The plaintext may be recovered by generating the same keystream using the same input parameters and applying a bit per bit binary addition with the ciphertext in a receiver, which may be a user equipment (UE), user plane entity (UPE), mobility management entity (MME), radio network controller (RNC), Node B or eNode B. The input parameters to the algorithm are a ciphering key CK, a time dependent 32 bits long ciphering sequence number COUNT-C, a bearer identity BEARER, a direction of transmission DIRECTION (0 for uplink and 1 for downlink) and length of the data LENGTH to be ciphered or deciphered. Based on these input parameters the algorithm generates the output keystream block KEYSTREAM that is used to encrypt the input plaintext block PLAINTEXT to produce the output ciphertext block CIPHERTEXT.

For the ciphering function it may be required that same input parameters must not be used twice. Thus, with the same ciphering key CK that may be 128 bits long, the combination of DIRECTION (e.g. 1 bit), sequence number COUNT-C (e.g. 32 bits) and BEARER (e.g. 5 bits) must be different for every encrypted/decrypted user plane (U-plane) packet.

The bearer identity BEARER may be 5 bits long, which means a numerical range from 0 to 31. If bearers are frequently created and destroyed, for example a new bearer for every call, it is very likely that the same bearer identity BEARER may be used with the same ciphering key CK. Thus, the sequence number COUNT-C has to be different each time the same bearer identity BEARER is used. Otherwise, the ciphering key CK has to be changed every time a bearer identity BEARER is to be re-used, which would be rather frequently.

In order to assure that same input parameters of a ciphering function are not used twice, an approach would be to change ciphering key CK when all available bearer identities BEARER have been consumed and start sequence numbers from 0 for each established bearer. Alternatively, the bits for the bearer identity BEARER could be increased.

Figure 5:
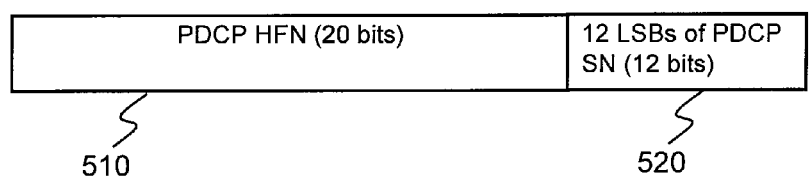
FIG. 5 shows a structure for a ciphering sequence number (COUNT-C) according to an embodiment of the invention.

FIG. 5 shows a structure for a ciphering sequence number COUNT-C 500 according to an embodiment of the invention. A packet data convergence protocol sequence number (PDCP SN) is configured for packet data convergence protocol (PDCP) ciphering process. Based on the packet data convergence protocol sequence number (PDCP SN), a COUNT-C format used for the packet data convergence protocol (PDCP) ciphering operation may be defined. The COUNT-C comprises two parts; a "long" sequence number 510, so called hyper frame number (HFN) and a "short" sequence number 520. Packet data convergence protocol (PDCP) entity may be configured to use packet data convergence protocol (PDCP) sequence number (16 bits) so the packet data convergence protocol sequence number (PDCP SN) may be used to form the "short" sequence number 520. However, the hyper frame number (HFN) field shall be greater than or equal to 20 bits since the hyper frame number (HFN) is used to calculate a new START value, which is 20-bit length and the hyper frame number (HFN) field is initialized by a START value. To satisfy this requirement, the COUNT-C 500 for packet data convergence protocol (PDCP) should comprise 20 bits hyper frame number (HFN)+12 least significant bits (LSB) of packet data convergence protocol sequence number (PDCP SN) as shown in FIG. 5. The hyper frame number (HFN) may be incremented by 1 when 12 least significant bits (LSB) of packet data convergence protocol sequence number (PDCP SN) is wrapped around.

Figure 6A:
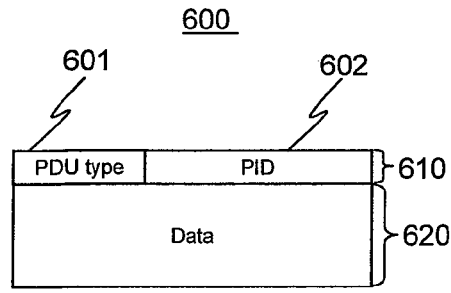
FIG. 6A shows a structure for a ciphering unit for packet data convergence protocol (PDCP) data protocol data unit (data PDU) according to an embodiment of the invention.

FIG. 6A shows a structure for a ciphering unit for packet data convergence protocol (PDCP) data protocol data unit (data PDU) 600 according to an embodiment of the invention. The ciphering unit may be the packet data convergence protocol (PDCP) protocol data unit (PDU) 600 excluding the packet data convergence protocol (PDCP) protocol data unit (PDU) header 610. For packet data convergence protocol (PDCP) ciphering, the data field 620 of the packet data convergence protocol (PDCP) protocol data unit (PDU) may be ciphered so that the receiver side (for example user equipment or radio network controller) can decode the packet data convergence protocol (PDCP) header 610 before the deciphering operation of the data part 620. For packet data convergence protocol (PDCP) data protocol data unit (PDU) 600, the ciphering unit is the packet data convergence protocol (PDCP) data protocol data unit (PDU) excluding the first octet, for example excluding the packet data convergence protocol (PDCP) data protocol data unit (PDU) header 610. Alternatively, the ciphering unit may be the packet data convergence protocol (PDCP) protocol data unit (PDU) 600 excluding the PDU type 601. For packet data convergence protocol (PDCP) ciphering, the data field 620 of the packet data convergence protocol (PDCP) protocol data unit (PDU) and the PID field 602 of the packet data convergence protocol (PDCP) protocol data unit (PDU) may be ciphered so that the receiver side (for example user equipment or radio network controller) can decode the PDU type 601 of the packet data convergence protocol (PDCP) header 610 before the deciphering operation of the PID field 602 and the data part 620. The receiver side (for example user equipment or radio network controller) may detect deciphering error by verifying the deciphered PID value. For packet data convergence protocol (PDCP) data protocol data unit (PDU) 600, the ciphering unit may be the packet data convergence protocol (PDCP) data protocol data unit (PDU) excluding the three most significant bits. For example, excluding the PDU type 601 of the packet data convergence protocol (PDCP) data protocol data unit (PDU) header 610.

Figure 6B:
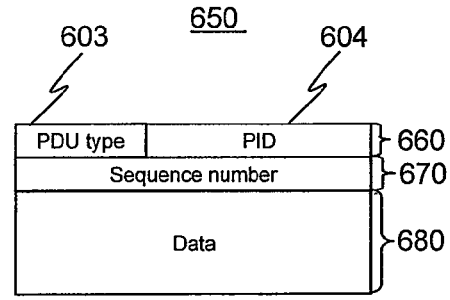
FIG. 6B shows a structure for a ciphering unit for packet data convergence protocol (PDCP) sequence number protocol data unit (SeqNum PDU) according to an embodiment of the invention.

FIG. 6B shows a structure for a ciphering unit for packet data convergence protocol (PDCP) sequence number protocol data unit (SeqNum PDU) 650 according to an embodiment of the invention. For packet data convergence protocol (PDCP) sequence number protocol data unit (SeqNum PDU) 650, the ciphering unit may be the packet data convergence protocol (PDCP) sequence number protocol data unit (SeqNum PDU) 650 excluding the first three octets, for example excluding the packet data convergence protocol (PDCP) sequence number protocol data unit (PDU) header 660 and the sequence number 670. For packet data convergence protocol (PDCP) ciphering, the data field 680 of the packet data convergence protocol (PDCP) protocol data unit (PDU) may be ciphered so that the receiver side (for example user equipment or radio network controller) can decode the packet data convergence protocol (PDCP) header 660 and the sequence number 670 before the deciphering operation of the data part 680. Alternatively, the ciphering unit may be the packet data convergence protocol (PDCP) sequence number protocol data unit (SeqNum PDU) 650 excluding the first three most significant bits For example, excluding the PDU type 603 of the packet data convergence protocol (PDCP) sequence number protocol data unit (PDU) header 660. For packet data convergence protocol (PDCP) ciphering, the PID field 604 and the data field 680 of the packet data convergence protocol (PDCP) protocol data unit (PDU) may be ciphered so that the receiver side can decode the PDU type 603 of the packet data convergence protocol (PDCP) header 660 before the deciphering operation of the ciphering unit. The receiver (for example user equipment or radio network controller) may detect deciphering error by verifying the deciphered PID value.

In an example embodiment of the invention, there are two ciphering configuration procedures: security mode control and radio bearer setup.

Security mode control procedure may be used to start or restart ciphering. During this procedure, the user equipment (UE) and the universal mobile telecommunications system terrestrial radio access network (UTRAN) may need to exchange ciphering activation time for the established radio bearers to synchronize. Exchange of the activation time for radio link control (RLC) acknowledged mode (AM) and unacknowledged mode (UM) may be created. The universal mobile telecommunications system terrestrial radio access network (UTRAN) indicates the downlink (DL) radio link control (RLC) sequence number (SN), in which the universal mobile telecommunications system terrestrial radio access network (UTRAN) starts using the new ciphering configurations. Indication may be done by using a "SecurityModeCommand" message. The user equipment (UE) may send an uplink (UL) radio link control (RLC) sequence number (SN), in which the user equipment (UE) starts using the new ciphering configuration indicated by the "SecurityModeComplete" message. Accordingly, for the packet data convergence protocol (PDCP) ciphering configuration, the packet data convergence protocol sequence number (PDCP SN) may be used to synchronize the ciphering configuration timing.

In an example embodiment of the invention, the universal mobile telecommunications system terrestrial radio access network (UTRAN) and the user equipment (UE) may exchange the packet data convergence protocol sequence number (PDCP SN), where the ciphering may start or restart during the security mode control procedure. The hyper frame number (HFN) of the COUNT-C for packet data convergence protocol (PDCP) may be set to the START value during the security mode control procedure. During the radio bearer establishment procedure the hyper frame number (HFN) of the COUNT-C for packet data convergence protocol (PDCP) may be set to a new START value that is calculated. The radio access bearer (RAB) replacement procedure may be used for the ciphering method switch between the radio link control (RLC) ciphering and the packet data convergence protocol (PDCP) ciphering. The hyper frame number (HFN) of the COUNT-C for packet data convergence protocol (PDCP) may be set to the new START value calculated during the serving radio network subsystem (SRNS) relocation procedure. The packet data convergence protocol sequence number (PDCP SN) may be initialized by 0, when lossy serving radio network subsystem (SRNS) relocation takes place.

The transmitter side may indicate the packet data convergence protocol sequence number (PDCP SN) for the first unsent packet data convergence protocol service data unit (PDCP SDU) in the corresponding message. Such message may be for example "SecurityModeCommand" for the universal mobile telecommunications system terrestrial radio access network (UTRAN) and "SecurityModeComplete" for the user equipment (UE). Any radio bearer using acknowledged mode (AM) or unacknowledged mode (UM) radio link control (RLC), other than a specific radio bearer, may be suspended during the security mode control procedure and resumed only after the activation time information exchange. Therefore, the packet data convergence protocol sequence number (PDCP SN) exchange via the radio resource control (RRC) messages may be sufficient to guarantee the ciphering synchronization. To start ciphering operation on a radio bearer, the hyper frame number (HFN) of COUNT-C may need to be initialized via the START value associated with the corresponding service domain for the radio access bearer.

When a new radio bearer is established and the ciphering operation has already been activated for the corresponding service domain, the ciphering operation may be started on the radio bearer to be established. User equipment (UE) may perform a new START value calculation before configuring the new radio bearer. After that, the hyper frame number (HFN) component of the COUNT-C may be initialized with the new calculated START value.

In an example embodiment of the invention, if the packet data convergence protocol (PDCP) ciphering method is introduced, the legacy radio network controller (RNC) may not be able to support the packet data convergence protocol (PDCP) ciphering feature. Therefore, the ciphering method switch procedure needs to be introduced. A radio access bearer (RAB) replacement procedure may be used for the ciphering method switch between radio link control (RLC) ciphering and packet data convergence protocol (PDCP) ciphering. The radio access bearer (RAB) replacement procedure comprises user equipment (UE) releasing layer 2 and 3 resources of a radio access bearer (RAB) if radio resource control (RRC) "RadioBearerSetup" message attempts to establish the radio access bearer (RAB), which has already been established. A new radio access bearer (RAB) is established by using the received new radio access bearer (RAB) configurations from scratch. The ciphering context is taken over by performing a new START value calculation before the internal radio access bearer (RAB) release and applying the new START value for the hyper frame number (HFN) of the COUNT-C upon the new radio access bearer (RAB) establishment.

In an example embodiment of the invention, packet data convergence protocol (PDCP) resides in serving radio network controller (SRNC) and therefore the security context may not need to be re-synchronized when the user equipment (UE) moves without changing the serving radio network controller (SRNC). In other words, the security context re-synchronization for packet data convergence protocol (PDCP) ciphering may need to be considered only for the serving radio network subsystem (SRNS) relocation cases. To maintain the security context after the serving radio network subsystem (SRNS) relocation, the user equipment (UE) may calculate a new START value for each active domain. After the serving radio network subsystem (SRNS) relocation, the user equipment (UE) and the new serving radio network controller (SRNC) may start using the new START value to initialize the hyper frame number (HFN) of the COUNT-C value.

In an example embodiment of the invention, packet data convergence protocol sequence number (PDCP SN) may be initialized by "0" when serving radio network subsystem (SRNS) relocation procedure without a lossless serving radio network subsystem (SRNS) relocation configuration (lossy SRNS relocation) takes place. When a serving radio network controller (SRNC) configures a lossless serving radio network subsystem (SRNS) relocation, the target radio network controller (RNC) may take over the packet data convergence protocol (PDCP) context after the serving radio network subsystem (SRNS) relocation. For example, the target radio network controller (RNC) may receive the packet data convergence protocol sequence number (PDCP SN) previously used in the source radio network controller (RNC) via radio access network application part (RANAP) interface. Therefore the user equipment (UE) and the target radio network controller (RNC) may maintain the packet data convergence protocol sequence number (PDCP SN) without any initialization and the required user equipment (UE) and network behavior may be identical to the lossless serving radio network subsystem (SRNS) relocation procedure.

The packet data convergence protocol (PDCP) ciphering may need to be re-synchronized if the corresponding radio link control (RLC) entity's data buffer is flushed due to radio link control (RLC) RESET procedure or radio link control (RLC) re-establishment procedure.

Radio link control (RLC) reset procedure, which is used to reset two acknowledged mode (AM) radio link control (RLC) peer entities, may exist. The radio link control (RLC) reset procedure may cause loosing some radio link control service data units (RLC SDU) so packet data convergence protocol (PDCP) ciphering re-synchronization needs to be done. The radio link control (RLC) reset procedure may contain radio link control (RLC) buffer flush (radio link control protocol data unit (RLC PDU) and radio link control service data unit (RLC SDU) discarding). Additionally the reset procedure may contain radio link control sequence number (RLC SN) re-synchronization and the highest hyper frame number (HFN) value exchange between the peer ends (for example COUNT-C value re-initialization). For packet data convergence protocol (PDCP) ciphering case, a COUNT-C re-initialization of packet data convergence protocol (PDCP) entity and a packet data convergence protocol sequence number (PDCP SN) re-synchronization may need to be considered.

In an example embodiment of the invention, for the hyper frame number (HFN) value exchange, as a packet data convergence protocol (PDCP) entity performs the ciphering operation, the packet data convergence protocol (PDCP) entity should be asked to provide the highest hyper frame number (HFN) value to radio link control (RLC) entity. The radio link control (RLC) entity may transfer the hyper frame number (HFN) value via the radio link control (RLC) RESET PDU or RESET ACK PDU to the peer end. The receiver packet data convergence protocol (PDCP) entity may set the hyper frame number (HFN) of the COUNT-C for the corresponding direction to the received hyper frame number (HFN) value.

In an example embodiment of the invention, for packet data convergence protocol sequence number (PDCP SN) re-synchronization, the transmitter packet data convergence protocol (PDCP) entity may send packet data convergence protocol (PDCP) sequence number protocol data unit (SeqNum PDU) indicating the packet data convergence protocol sequence number (PDCP SN) to the lower layer just after the successful radio link control (RLC) reset procedure. The transmitter packet data convergence protocol (PDCP) shall not send any packet data convergence protocol (PDCP) data protocol data unit (PDU) after the radio link control (RLC) reset procedure until the packet data convergence protocol (PDCP) sequence number protocol data unit (SeqNum PDU) submission, enabling the peer ends to re-synchronize the ciphering.

The radio link control (RLC) re-establishment procedure may be used by radio resource control (RRC) to reset the radio link control (RLC) peer ends. The radio link control (RLC) re-establishment procedure may consist of a radio link control (RLC) buffer flush, a radio link control sequence number (RLC SN) re-synchronization, or COUNT-C initialization. For packet data convergence protocol (PDCP) ciphering case, a COUNT-C re-initialization and a packet data convergence protocol sequence number (PDCP SN) re-synchronization may need to be considered on top of the radio link control (RLC) re-establishment procedure.

The radio resource control (RRC) peer ends may exchange the new START value to re-synchronize the COUNT-C value as the part of the radio resource control (RRC) procedure involving the radio link control (RLC) re-establishment. For packet data convergence protocol (PDCP) ciphering case, the hyper frame number (HFN) of the COUNT-C may be set to the new START value upon radio link control (RLC) re-establishment.

In an example embodiment of the invention, the user equipment (UE) may perform a radio link control (RLC) re-establishment procedure. Such procedure may take place when the user equipment (UE) performs a serving radio network subsystem (SRNS) relocation or in case the user equipment (UE) performs a radio link control protocol data unit (RLC PDU) size change. Furthermore, the re-establishment procedure may take place in case the user equipment (UE) encounters a radio link control (RLC) unrecoverable error.

There may be two types of radio link control protocol data unit (RLC PDU) size change. Such types are a lossless downlink protocol data unit (PDU) size change and lossy protocol data unit (PDU) size change. For lossless downlink protocol data unit (PDU) size change case, the radio network controller (RNC) and the user equipment (UE) may maintain the downlink packet data convergence protocol sequence number (PDCP SN) during the downlink radio link control (RLC) re-establishment. Therefore, the downlink packet data convergence protocol sequence number (PDCP SN) re-synchronization may not be needed. For lossy radio link control protocol data unit (RLC PDU) size change cases (including uplink protocol data unit (PDU) size change when lossless downlink protocol data unit (PDU) size change is configured), the packet data convergence protocol sequence number (PDCP SN) may not be maintained by the user equipment (UE) and the radio network controller (RNC). The transmitter packet data convergence protocol (PDCP) entity may thus initiate the packet data convergence protocol sequence number (PDCP SN) synchronization procedure by sending a packet data convergence protocol (PDCP) sequence number protocol data unit (SeqNum PDU) enabling the receiver packet data convergence protocol (PDCP) entity to re-synchronize the packet data convergence protocol sequence number (PDCP SN).

In an example embodiment of the invention, the user equipment (UE) may detect a radio link control (RLC) unrecoverable error. In such a case, the packet data convergence protocol sequence number (PDCP SN) between the peer ends may become out-of-sync. Therefore, the transmitter packet data convergence protocol (PDCP) entity may initiate the packet data convergence protocol sequence number (PDCP SN) synchronization procedure by sending a packet data convergence protocol (PDCP) sequence number protocol data unit (SeqNum PDU) enabling the receiver packet data convergence protocol (PDCP) entity to re-synchronize the packet data convergence protocol sequence number (PDCP SN).

The transmitter radio link control (RLC) may send a status protocol data unit (PDU) including "Move Receiving Window" super-field when giving up transmitting one or more radio link control service data unit (RLC SDU) to the receiver. If the radio link control (RLC) receiving window needs to be moved, the receiver packet data convergence protocol (PDCP) entity needs to know how many packet data convergence protocol (PDCP) protocol data units (PDU) are discarded due to the move receiving window (MRW) procedure.

Figure 7:
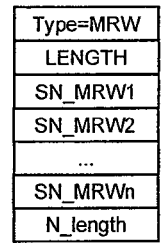
FIG. 7 shows a structure for a move receiving window (MRW) fields in a status protocol data unit (PDU) according to an embodiment of the invention.

FIG. 7 shows a structure for move receiving window (MRW) fields in a STATUS protocol data unit (PDU) according to an embodiment of the invention. When "Send MRW" signal is configured, a SN_MRWi may be used to indicate the end of each discarded radio link control service data unit (RLC SDU). For example, the number of SN_MRWi fields may equal the number of radio link control service data units (RLC SDU) discarded by that move receiving window (MRW) super-field (SUFI). Therefore, the receiver radio link control (RLC) can know how many radio link control service data units (RLC SDU) will be discarded when the transmitter radio link control (RLC) is configured with "Send MRW".

If "Send MRW" is configured for the transmitter radio link control (RLC), the receiver may indicate how many radio link control service data units (RLC SDU) (equals to packet data convergence protocol (PDCP) protocol data units (PDU)) are discarded to the corresponding packet data convergence protocol (PDCP) entity. Thus, the receiver packet data convergence protocol (PDCP) entity can update the uplink or downlink packet data convergence protocol sequence number (PDCP SN) and continue deciphering a received packet data convergence protocol (PDCP) protocol data unit (PDU) with a correct packet data convergence protocol sequence number (PDCP SN).

If "Send MRW" is not configured for the transmitter radio link control (RLC), the receiver may not know how many radio link control service data units (RLC SDU) are dropped due to the move receiving window (MRW) procedure. Therefore, the transmitter packet data convergence protocol (PDCP) entity may be informed about the initiation of move receiving window (MRW) procedure from the transmitter radio link control (RLC). Thus, the transmitter packet data convergence protocol (PDCP) entity may initiate the packet data convergence protocol sequence number (PDCP SN) synchronization procedure.

If the receiver packet data convergence protocol (PDCP) or any layer corresponding to the packet data convergence protocol (PDCP) detects data corruption in the received data, the receiver packet data convergence protocol (PDCP) may trigger a call re-establishment procedure so that the ciphering re-synchronisation takes place.

Figure 8:
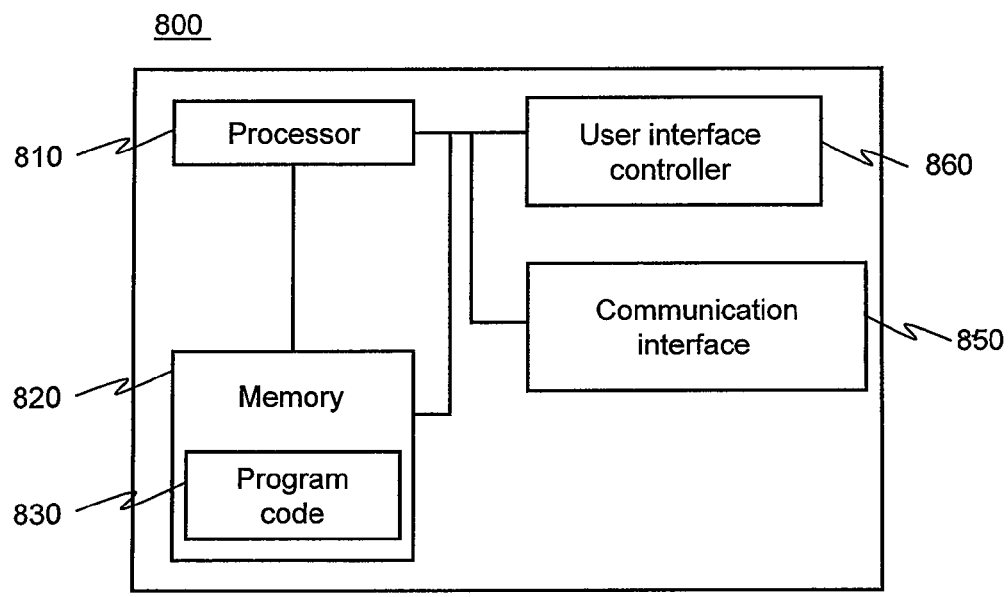
FIG. 8 presents an example block diagram of an apparatus in which various embodiments of the invention may be applied.

FIG. 8 presents an example block diagram of an apparatus 800 in which various embodiments of the invention may be applied. This may be a user equipment (UE), user device or apparatus, such as a mobile terminal or other communication device.

The general structure of the apparatus 800 comprises a communication interface module 850, a processor 810 coupled to the communication interface module 850, and a memory 820 coupled to the processor 810. The apparatus further comprises software 830 stored in the memory 820 and operable to be loaded into and executed in the processor 810. The software 830 may comprise one or more software modules and can be in the form of a computer program product. The apparatus 800 further comprises a user interface controller 860 coupled to the processor 810.

The communication interface module 850 implements at least part of the user data radio discussed in connection with various embodiments of the invention. The communication interface module 850 may be, e.g., a radio interface module, such as a WLAN, Bluetooth, GSM/GPRS, CDMA, WCDMA, or LTE (Long Term Evolution) radio module. The communication interface module 850 may be integrated into the apparatus 800 or into an adapter, card or the like that may be inserted into a suitable slot or port of the apparatus 800. The communication interface module 850 may support one radio interface technology or a plurality of technologies. FIG. 8 shows one communication interface module 850, but the apparatus 800 may comprise a plurality of communication interface modules 850.

The processor 810 may be, e.g., a central processing unit (CPU), a microprocessor, a digital signal processor (DSP), a graphics processing unit, or the like. FIG. 8 shows one processor 810, but the apparatus 800 may comprise a plurality of processors.

The memory 820 may be for example a non-volatile or a volatile memory, such as a read-only memory (ROM), a programmable read-only memory (PROM), erasable programmable read-only memory (EPROM), a random-access memory (RAM), a flash memory, a data disk, an optical storage, a magnetic storage, a smart card, or the like. The apparatus 800 may comprise a plurality of memories. The memory 820 may be constructed as a part of the apparatus 800 or it may be inserted into a slot, port, or the like of the apparatus 800 by a user. The memory 820 may serve the sole purpose of storing data, or it may be constructed as a part of an apparatus serving other purposes, such as processing data.

The user interface controller 860 may comprise circuitry for receiving input from a user of the apparatus 800, e.g., via a keyboard, graphical user interface shown on the display of the apparatus 800, speech recognition circuitry, or an accessory device, such as a headset, and for providing output to the user via, e.g., a graphical user interface or a loudspeaker.

A skilled person appreciates that in addition to the elements shown in FIG. 8, the apparatus 800 may comprise other elements, such as microphones, displays, as well as additional circuitry such as input/output (I/O) circuitry, memory chips, application-specific integrated circuits (ASIC), processing circuitry for specific purposes such as source coding/decoding circuitry, channel coding/decoding circuitry, ciphering/deciphering circuitry, and the like. Additionally, the apparatus 800 may comprise a disposable or rechargeable battery (not shown) for powering the apparatus 800 when external power if external power supply is not available.

Figure 9:
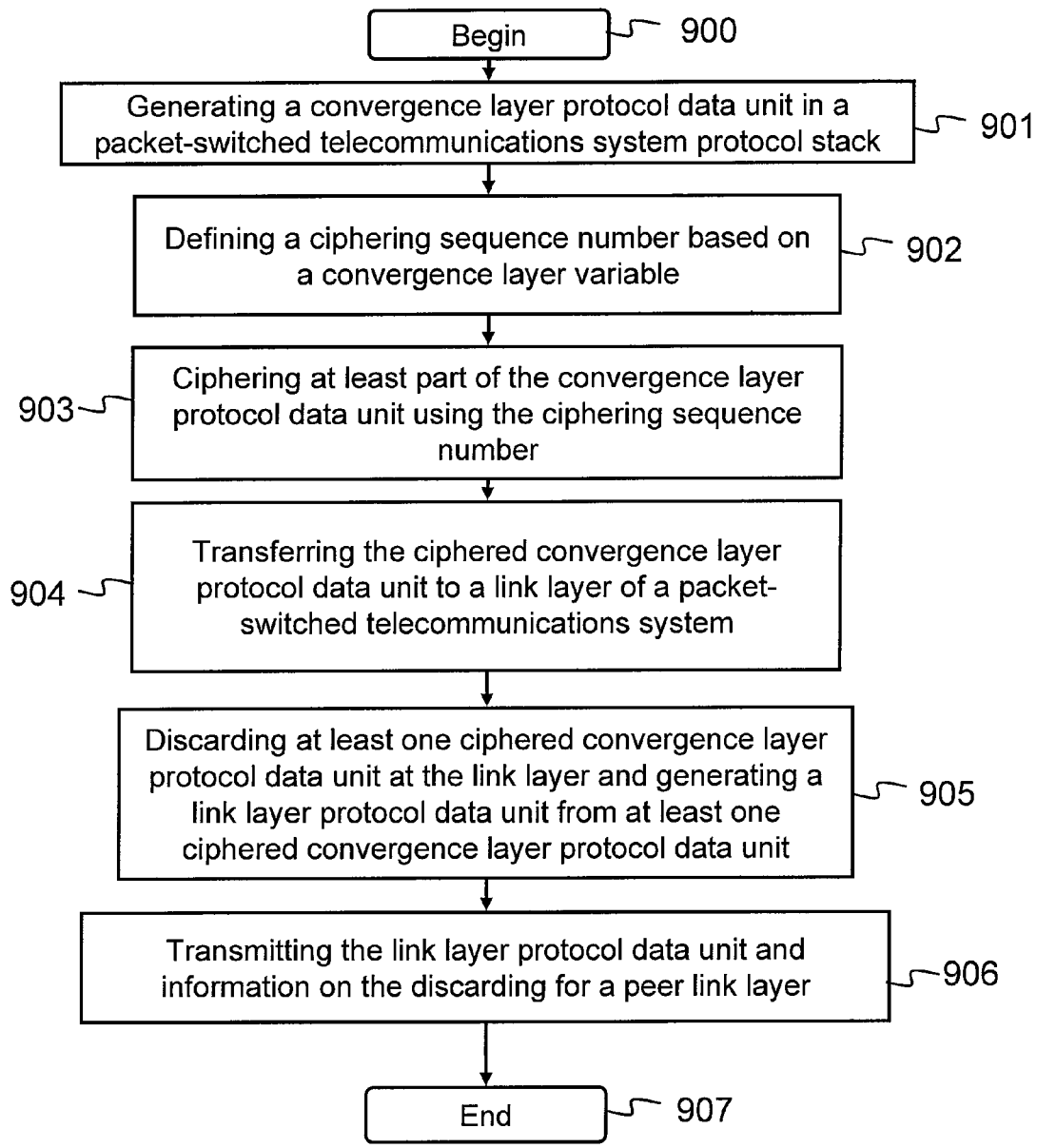
FIG. 9 shows a flow diagram showing ciphering operations in an apparatus in accordance with an example embodiment of the invention.

FIG. 9 shows a flow diagram showing ciphering operations in an apparatus in accordance with an example embodiment of the invention. In step 900, the method is started. In step 901, a convergence layer protocol data unit in a packet-switched telecommunications system protocol stack is generated. In step 902, a ciphering sequence number based on a convergence layer variable is defined. In step 903, at least part of the convergence layer protocol data unit is ciphered using the ciphering sequence number. In step 904, the ciphered convergence layer protocol data unit is transferred to a link layer of a packet-switched telecommunications system. In step 905, at least one ciphered convergence layer protocol data unit is discarded at the link layer and a link layer protocol data unit is generated from at least one ciphered convergence layer protocol data unit. In step 906, the link layer protocol data unit and information on the discarding is transmitted for a peer link layer. The method ends in step 907.

Figure 10:
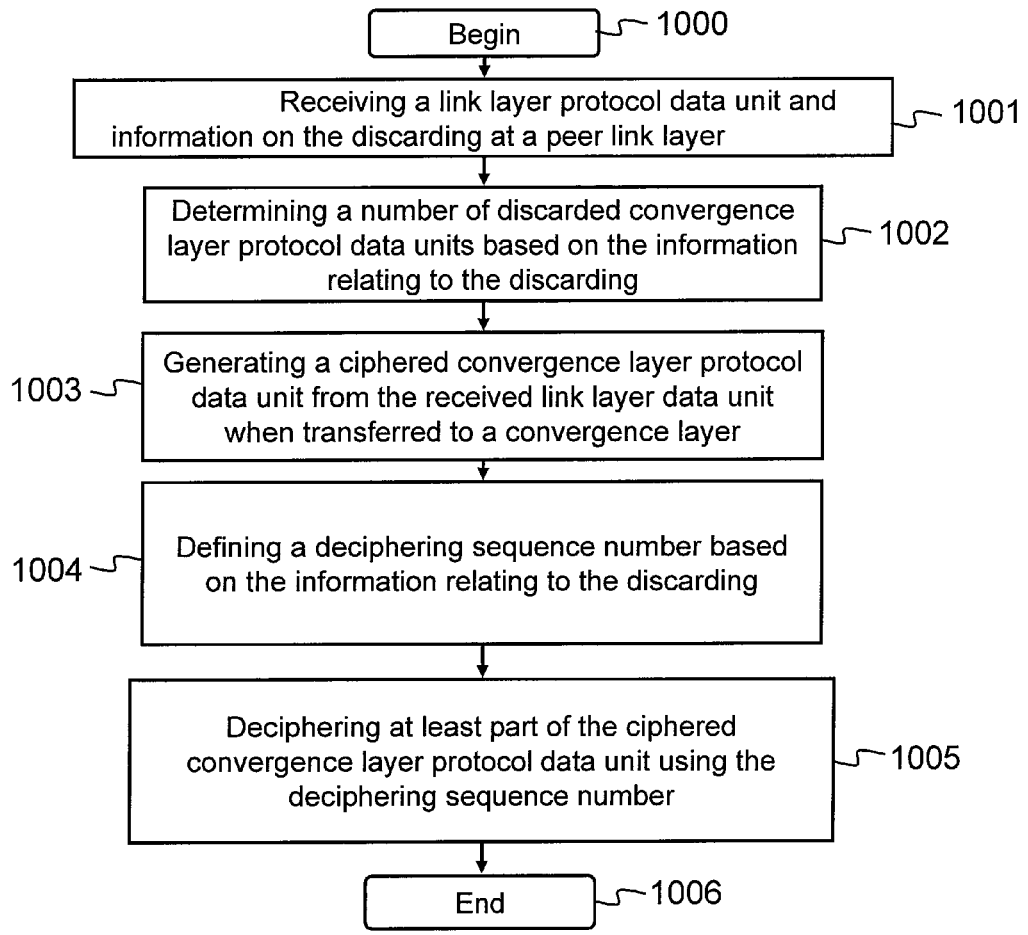
FIG. 10 shows a flow diagram showing deciphering operations in an apparatus in accordance with an example embodiment of the invention.

FIG. 10 shows a flow diagram showing deciphering operations in an apparatus in accordance with an example embodiment of the invention. In step 1000, the method is started. In step 1001, a link layer protocol data unit and information relating to discarding of at least one ciphered convergence layer protocol data unit is received at a peer link layer in a packet-switched telecommunications system. In step 1002, a number of discarded convergence layer protocol data units is determined at the peer link layer based on the information relating to the discarding. Furthermore, the number of discarded convergence layer protocol data units is transferred to the convergence layer. In step 1003, a ciphered convergence layer protocol data unit is generated from the received link layer data unit when transferred to a convergence layer. In step 1004, a deciphering sequence number is defined based on the information relating to the discarding. In step 1005, at least part of the ciphered convergence layer protocol data unit is deciphered using the deciphering sequence number. The method ends in step 1006.

Ciphering and deciphering operations may be carried out in a single apparatus. Alternatively, ciphering and deciphering operations may be carried out in separate apparatuses.

Various embodiments have been presented. It should be appreciated that in this document, words comprise, include and contain are each used as open-ended expressions with no intended exclusivity.

The foregoing description has provided by way of non-limiting examples of particular implementations and embodiments of the invention a full and informative description of the best mode presently contemplated by the inventors for carrying out the invention. It is however clear to a person skilled in the art that the invention is not restricted to details of the embodiments presented above, but that it can be implemented in other embodiments using equivalent means or in different combinations of embodiments without deviating from the characteristics of the invention.

Furthermore, some of the features of the above-disclosed embodiments of this invention may be used to advantage without the corresponding use of other features. As such, the foregoing description shall be considered as merely illustrative of the principles of the present invention, and not in limitation thereof. Hence, the scope of the invention is only restricted by the appended patent claims.

The invention claimed is:

1. A method comprising:
generating a plurality of convergence layer protocol data units in a packet-switched telecommunications system protocol stack;
ciphering said plurality of convergence layer protocol data units using a ciphering sequence number;
determining to transfer said plurality of ciphered convergence layer protocol data units to a link layer of the packet-switched telecommunications system;
discarding at least one ciphered convergence layer protocol data unit at the link layer and generating a link layer protocol data unit from at least one of the ciphered convergence layer protocol data units that has not been discarded; and
determining to transmit the link layer protocol data unit and information relating to the discarding for a peer link layer,
wherein one or more of:
the information relating to the discarding contains initiation data of a convergence layer sequence number synchronization procedure for synchronizing ciphering configuration timing; and
a data part of the convergence layer protocol data unit is ciphered and the ciphered data part of the convergence layer protocol data unit is a convergence layer sequence number protocol data unit excluding a first three octets of the convergence layer sequence number protocol data unit.

2. The method of claim 1, wherein the ciphering sequence number is a count-c parameter comprising 20 bits of convergence layer hyper frame number and 12 bits of convergence layer sequence number.

3. The method of claim 1, wherein the information relating to the discarding contains a status protocol data unit indicative of a set of discarded convergence layer protocol data units.

4. The method of claim 3, wherein a move receiving window super-field of the status protocol data unit is used for indicating the set of discarded convergence layer protocol data units.

5. The method of claim 1, wherein the ciphered data part of the convergence layer protocol data unit is a convergence layer data protocol data unit excluding a first octet of the convergence layer data protocol data unit.

6. The method of claim 1, wherein a data part and a header part of the convergence layer protocol data unit are ciphered.

7. The method of claim 1, wherein the convergence layer is a packet data convergence protocol layer and the link layer is a radio link control layer.

8. A method comprising:
receiving a link layer protocol data unit and information relating to discarding of at least one ciphered convergence layer protocol data unit, at a peer link layer in a packet-switched telecommunications system, wherein a data part of the convergence layer protocol data unit is ciphered and the ciphered data part of the convergence layer protocol data unit is a convergence layer sequence number protocol data unit excluding a first three octets of the convergence layer sequence number protocol data unit;
generating a ciphered convergence layer protocol data unit from the received link layer data unit when transferred to a convergence layer;
defining, based on the information relating to the discarding, a deciphering sequence number; and
deciphering the ciphered convergence layer protocol data unit using the deciphering sequence number.

9. The method of claim 8, wherein the deciphering sequence number is a count-c parameter comprising 20 bits of convergence layer hyper frame number and 12 bits of convergence layer sequence number.

10. The method of claim 8, further comprising:
determining a number of discarded convergence layer protocol data units at the peer link layer based on the information relating to the discarding; and
determining to transfer the number of discarded convergence layer protocol data units to the convergence layer.

11. The method of claim 10, further comprising:
updating a convergence layer sequence number based on the number of discarded convergence layer protocol data units.

12. The method of claim 8, wherein the information relating to the discarding contains initiation information of a convergence layer sequence number synchronization procedure.

13. The method of claim 8, further comprising:
detecting corruption of data in the deciphered convergence layer protocol data units at the convergence layer; and
determining to inform an upper layer of a need for a ciphering re-synchronization.

14. The method of claim 13, wherein the ciphering re-synchronization is carried out by a call re-establishment procedure.

15. The method of claim 8, wherein the convergence layer is a packet data convergence protocol layer and the link layer is a radio link control layer.

16. An apparatus comprising:
at least one processor;
at least one memory including computer program code, the at least one memory and the computer program code configured to, with the at least one processor, cause the apparatus at least to perform:
generate a plurality of convergence layer protocol data units in a packet-switched telecommunications system protocol stack;
cipher said plurality of convergence layer protocol data units using a ciphering sequence number;
determine to transfer said plurality of ciphered convergence layer protocol data units to a link layer of the packet-switched telecommunications system;
discard at least one ciphered convergence layer protocol data unit at the link layer and generate a link layer protocol data unit from at least one of the ciphered convergence layer protocol data units that has not been discarded; and
determine to transmit the link layer protocol data unit and information relating to the discarding for a peer link layer,
wherein one or more of:
the information relating to the discarding contains initiation data of a convergence layer sequence number synchronization procedure for synchronizing ciphering configuration timing; and
a data part of the convergence layer protocol data unit is ciphered and the ciphered data part of the convergence layer protocol data unit is a convergence layer sequence number protocol data unit excluding a first three octets of the convergence layer sequence number protocol data unit.

17. The apparatus of claim 16, wherein the ciphering sequence number is a count-c parameter comprising 20 bits of convergence layer hyper frame number and 12 bits of convergence layer sequence number.

18. The apparatus of claim 16, wherein the information relating to the discarding contains a status protocol data unit indicative of a set of discarded convergence layer protocol data units.

19. The apparatus of claim 18, wherein a move receiving window super-field of the status protocol data unit indicative of the set of discarded convergence layer protocol data units.

20. The apparatus of claim 16, wherein the convergence layer is a packet data convergence protocol layer and the link layer is a radio link control layer.

21. An apparatus comprising:
at least one processor;
at least one memory including computer program code, the at least one memory and the computer program code configured to, with the at least one processor, cause the apparatus at least to perform:
receive a link layer protocol data unit and information relating to discarding of at least one ciphered protocol data unit at a peer link layer in a packet-switched telecommunications system;
generate a ciphered convergence layer protocol data unit from the received link layer protocol data unit in a packet-switched telecommunications system protocol stack, wherein a data part of the convergence layer protocol data unit is ciphered and the ciphered data part of the convergence layer protocol data unit is a convergence layer sequence number protocol data unit excluding a first three octets of the convergence layer sequence number protocol data unit;
define, based on the information relating to the discarding, a deciphering sequence number; and
decipher the ciphered convergence layer protocol data unit using the deciphering sequence number.

22. The apparatus of claim 21, wherein the at least one memory and the computer program code are further configured to, with the at least one processor, cause the apparatus to further perform:
- determine a number of discarded convergence layer protocol data units at the peer link layer based on the information relating to the discarding; and
- determine to transfer the number of discarded convergence layer protocol data units to the convergence layer.

23. The apparatus of claim 22, wherein the at least one memory and the computer program code are further configured to, with the at least one processor, cause the apparatus to further perform:
- update a convergence layer sequence number based on the number of discarded convergence layer protocol data units.

24. The apparatus of claim 21, wherein the information relating to the discarding contains initiation of a convergence layer sequence number synchronization procedure.

25. The apparatus of claim 21, wherein the at least one memory and the computer program code are further configured to, with the at least one processor, cause the apparatus to further perform:
- detect a corruption of data in the deciphered convergence layer protocol data units at the convergence layer; and
- determine to inform an upper layer of a need for a ciphering re-synchronization.

26. A computer program product comprising computer executable program code recorded on a non-transitory computer readable storage medium, the computer executable program code comprising:
- code for causing generation of a plurality of convergence layer protocol data units in a packet-switched telecommunications system protocol stack;
- code for causing cipher of said plurality of convergence layer protocol data units using a ciphering sequence number;
- code for causing determination to transfer said plurality of ciphered convergence layer protocol data units to a link layer of the packet-switched telecommunications system;
- code for causing discard of at least one ciphered convergence layer protocol data unit at the link layer and generating a link layer protocol data unit from at least one of the ciphered convergence layer protocol data units that has not been discarded; and
- code for causing determination to transmit the link layer protocol data unit and information relating to the discarding for a peer link layer, wherein one or more of:
- the information relating to the discarding contains initiation data of a convergence layer sequence number synchronization procedure for synchronizing ciphering configuration timing; and
- a data part of the convergence layer protocol data unit is ciphered and the ciphered data part of the convergence layer protocol data unit is a convergence layer sequence number protocol data unit excluding a first three octets of the convergence layer sequence number protocol data unit.

27. A computer program product comprising computer executable program code recorded on a non-transitory computer readable storage medium, the computer executable program code comprising:
- code for causing receipt of a link layer protocol data unit and information relating to discarding of at least one ciphered convergence layer protocol data unit at a peer link layer in a packet-switched telecommunications system, wherein a data part of the convergence layer protocol data unit is ciphered and the ciphered data part of the convergence layer protocol data unit is a convergence layer sequence number protocol data unit excluding a first three octets of the convergence layer sequence number protocol data unit;
- code for causing generation of a ciphered convergence layer protocol data unit from the received link layer data unit when transferred to a convergence layer;
- code for causing definition, based on the information relating to the discarding, of a deciphering sequence number; and
- code for causing decipher of the ciphered convergence layer protocol data unit using the deciphering sequence number.

* * * * *